United States Patent
Stroia et al.

(10) Patent No.: US 8,256,210 B2
(45) Date of Patent: Sep. 4, 2012

(54) FLEXIBLE FUEL INJECTION FOR MULTIPLE MODES OF DIESEL ENGINE EXHAUST AFTERTREATMENT

(75) Inventors: Bradlee J. Stroia, Columbus, IN (US); Samuel C. Geckler, Columbus, IN (US); Michael Cunningham, Greenwood, IN (US); Wole Akinyemi, Clifton Park, NY (US); Paul R. Miller, Columbus, IN (US); Lyle Kocher, Franklin, IN (US)

(73) Assignee: Cummins Inc., Columbus, IN (US)

( * ) Notice: Subject to any disclaimer, the term of this patent is extended or adjusted under 35 U.S.C. 154(b) by 894 days.

(21) Appl. No.: 12/002,804

(22) Filed: Dec. 18, 2007

(65) Prior Publication Data

US 2008/0196392 A1    Aug. 21, 2008

Related U.S. Application Data

(60) Provisional application No. 60/876,221, filed on Dec. 21, 2006.

(51) Int. Cl.
*F01N 3/00* (2006.01)
*F01N 3/10* (2006.01)

(52) U.S. Cl. .............. 60/295; 60/284; 60/303
(58) Field of Classification Search ............. 60/295
See application file for complete search history.

(56) References Cited

U.S. PATENT DOCUMENTS

| | | |
|---|---|---|
| 5,956,942 A | 9/1999 | Sebastiano et al. |
| 6,016,653 A | 1/2000 | Glassey et al. |
| 6,378,297 B1 | 4/2002 | Ito et al. |
| 6,491,016 B1 | 12/2002 | Buratti |
| 6,666,020 B2 | 12/2003 | Tonetti et al. |
| 6,725,649 B2 | 4/2004 | Yamashita et al. |
| 6,820,415 B2 | 11/2004 | Abet et al. |
| 6,901,747 B2 | 6/2005 | Tashiro et al. |
| 6,948,476 B2 | 9/2005 | Gioannini et al. |
| 6,962,045 B2 | 11/2005 | Kitahara et al. |
| 6,990,951 B1 | 1/2006 | Liu et al. |
| 7,036,489 B1 | 5/2006 | Wu et al. |
| 7,055,311 B2 | 6/2006 | Beutel et al. |
| 7,059,121 B2 | 6/2006 | Coillard |
| 7,063,642 B1 | 6/2006 | Hu et al. |
| 7,181,902 B2 | 2/2007 | Naik |
| 7,181,908 B2 | 2/2007 | Naik |

(Continued)

FOREIGN PATENT DOCUMENTS

| | | |
|---|---|---|
| EP | 1035314 A2 * | 9/2000 |
| WO | WO 2004/020807 | 3/2004 |

*Primary Examiner* — Thomas Denion
*Assistant Examiner* — Jason Shanske
(74) *Attorney, Agent, or Firm* — Krieg DeVault LLP

(57) ABSTRACT

One embodiment is a system including a controller operable to control fuel injection events. The system is operable in a base mode, and at least one of a deNOx mode, a deSOx mode, and a deSoot mode. The base mode includes a pilot injection pulse, a main injection pulse, a post injection pulse, and a second post injection pulse. The deNOx mode includes a pilot injection pulse, a main injection pulse, and a post injection pulse. The deSOx mode includes a pilot injection pulse, a main injection pulse, a post injection pulse, a second post injection pulse, and a third post injection pulse. The deSoot mode includes a pilot injection pulse, a main injection pulse, a post injection pulse, a second post injection pulse, and a third post injection pulse. Further embodiments, forms, objects, features, advantages, aspects, and benefits shall become apparent from the following description and drawings.

21 Claims, 8 Drawing Sheets

U.S. PATENT DOCUMENTS

| | | |
|---|---|---|
| 7,191,590 B2 | 3/2007 | Nagaoka et al. |
| 7,216,481 B2 | 5/2007 | MacBain et al. |
| 2003/0033800 A1* | 2/2003 | Tonetti et al. .................. 60/286 |
| 2004/0040287 A1 | 3/2004 | Beutel et al. |
| 2005/0050884 A1* | 3/2005 | Nagaoka et al. ............... 60/295 |
| 2005/0072141 A1 | 4/2005 | Kitahara |
| 2006/0107652 A1 | 5/2006 | Chaouche et al. |
| 2006/0130460 A1 | 6/2006 | Warner |
| 2006/0168945 A1 | 8/2006 | Samad et al. |
| 2007/0144149 A1 | 6/2007 | Kolavennu et al. |

* cited by examiner

FLEXIBLE FUEL INJECTION FOR MULTIPLE MODES OF DIESEL ENGINE EXHAUST AFTERTREATMENT

CROSS REFERENCE

This application claims the benefit of U.S. Application No. 60/876,221 filed Dec. 21, 2006, and the same is hereby incorporated by reference.

BACKGROUND

Diesel engines produce a number of combustion products including particulates, hydrocarbons ("HC"), carbon monoxide ("CO"), oxides of nitrogen ("NOx"), and oxides of sulfur ("SOx"). Future diesel engines will likely require exhaust aftertreatment systems to reduce emissions of these and other products of combustion. Such exhaust aftertreatment systems may include a number of components including catalytic conversion components, particulate filters, and others which can be operated in a variety of modes. In addition to base modes of operation, from time to time it may be necessary to implement regeneration modes which regenerate various components of exhaust aftertreatment systems. There is a need for apparatuses, systems and methods of flexible fuel injection in the foregoing and other modes.

SUMMARY

One embodiment is a system including a controller operable to control fuel injection events. The system is operable in a base mode, and at least one of a deNOx mode, a deSOx mode, and a deSoot mode. The base mode includes a pilot injection pulse, a main injection pulse, a post injection pulse, and a second post injection pulse. The deNOx mode includes a pilot injection pulse, a main injection pulse, and a post injection pulse. The deSOx mode includes a pilot injection pulse, a main injection pulse, a post injection pulse, a second post injection pulse, and a third post injection pulse. The deSoot mode includes a pilot injection pulse, a main injection pulse, a post injection pulse, a second post injection pulse, and a third post injection pulse. Further embodiments, forms, objects, features, advantages, aspects, and benefits shall become apparent from the following description and drawings.

DETAILED DESCRIPTION

Figure 1:
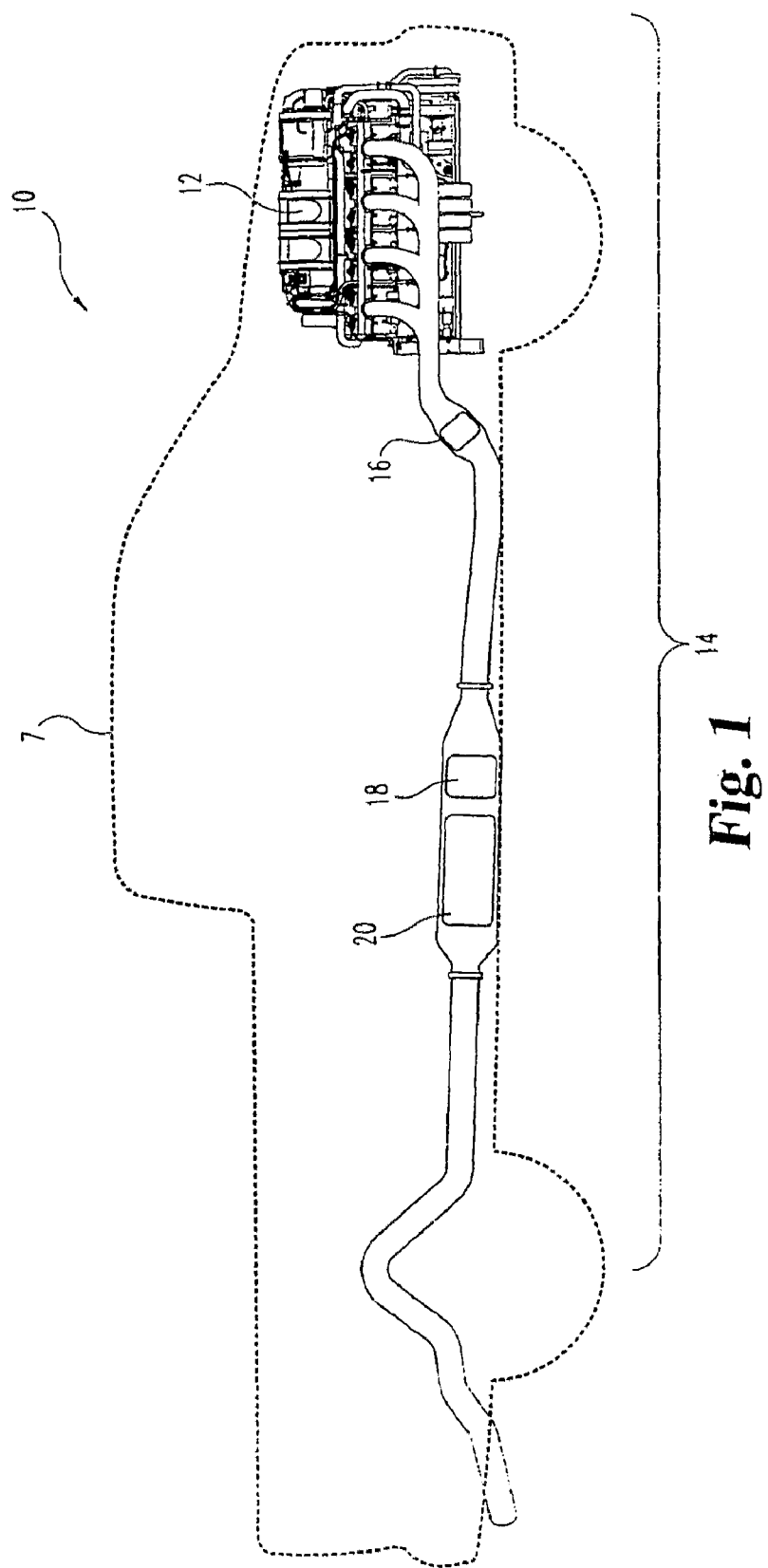
FIG. 1 is a schematic of an integrated engine-exhaust aftertreatment system provided in a vehicle.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

With reference to FIG. 1, there is illustrated a schematic of a preferred integrated engine-exhaust aftertreatment system 10 provided in a vehicle 7. The aftertreatment subsystem 14 includes a diesel oxidation catalyst 16 which is preferably a close coupled catalyst but could be other types of catalyst units such as a semi-close coupled catalyst, a NOx adsorber or lean NOx trap 18, and a diesel particulate filter 20 which are coupled in flow series to receive and treat exhaust output from engine 12.

The diesel oxidation catalyst unit 16 is preferably a flow through device that includes a honey-comb like substrate. The substrate has a surface area that includes a catalyst. As exhaust gas from the engine 12 traverses the catalyst, substances including CO, gaseous HC and liquid HC (unburned fuel and oil) are oxidized. As a result, these substances are converted to carbon dioxide and water. During operation, the diesel oxidation catalyst unit 16 is heated to a desired temperature value.

The NOx adsorber 18 is operable to adsorb NOx and SOx emitted from engine 12 to reduce their emission into the atmosphere. The NOx adsorber 18 preferably includes catalyst sites which catalyze oxidation reactions and storage sites which store compounds. After NOx adsorber 18 reaches a certain storage capacity it is preferably regenerated through deNOx and/or deSOx processes.

The diesel particulate filter 20 may include one or more of several types of particle filters. The diesel particulate filter 20 is utilized to capture unwanted diesel particulate matter from the flow of exhaust gas exiting the engine 12. Diesel particulate matter includes sub-micron size particles found in diesel exhaust, including both solid and liquid particles, and may be classified into several fractions including: inorganic carbon (soot), organic fraction (often referred to as SOF or VOF), and sulfate fraction (hydrated sulfuric acid). The diesel particulate filter 20 may be regenerated by oxidizing the particulates trapped by the diesel particulate filter 20.

Figure 2:
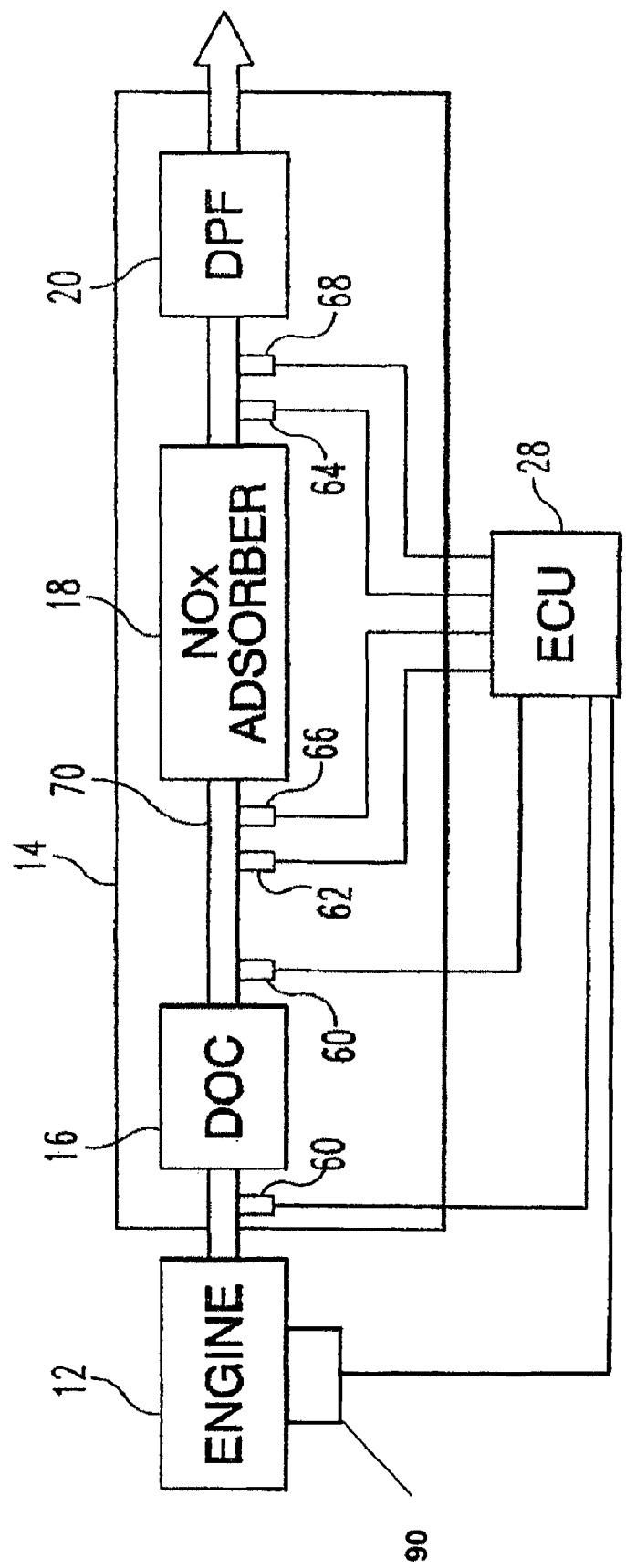
FIG. 2 is a schematic of an integrated engine-exhaust aftertreatment system operatively coupled with an engine control unit.

With reference to FIG. 2, there is illustrated a schematic of integrated engine-exhaust aftertreatment system 10 operatively coupled with an engine control unit ("ECU") 28. At least one temperature sensor 60 is connected with the diesel oxidation catalyst unit 16 for measuring the temperature of the exhaust gas as it enters the diesel oxidation catalyst unit 16. In other embodiments, two temperature sensors 60 are used, one at the entrance or upstream from the diesel oxidation catalyst unit 16 and another at the exit or downstream from the diesel oxidation catalyst unit 60. Information from temperature sensor(s) 60 is provided to ECU 28 and used to calculate the temperature of the diesel oxidation catalyst unit 16.

A first NOx temperature sensor 62 senses the temperature of flow entering or upstream of NOx adsorber 18 and provides a signal to ECU 28. A second NOx temperature sensor 64 senses the temperature of flow exiting or downstream of NOx adsorber 18 and provides a signal to ECU 28. NOx temperature sensors 62 and 64 are used to monitor the temperature of the flow of gas entering and exiting the NOx adsorber 18 and provide signals that are indicative of the temperature of the flow of exhaust gas to the ECU 28. An algorithm may then be used by the ECU 28 to determine the operating temperature of the NOx adsorber 18.

A first universal exhaust gas oxygen ("UEGO") sensor or lambda sensor 66 is positioned in fluid communication with the flow of exhaust gas entering or upstream from the NOx adsorber 18 and a second UEGO sensor 68 is positioned in fluid communication with the flow of exhaust gas exiting or downstream of the NOx adsorber 18. The UEGO sensors 66, 68 are connected with the ECU 28 and generate electric signals that are indicative of the amount of oxygen contained in the flow of exhaust gas. The UEGO sensors 66, 68 allow the ECU 28 to accurately monitor air-fuel ratios ("AFR") also over a wide range thereby allowing the ECU 28 to determine a lambda value associated with the exhaust gas entering and exiting the NOx adsorber 18.

Engine 12 includes a fuel injection system 90 that is operatively coupled to, and controlled by, the ECU 28. Fuel injection system 90 delivers fuel into the cylinders of the engine 12. Various types of fuel injection systems may be utilized in the present invention, including, but not limited to, pump-line-nozzle injection systems, unit injector and unit pump systems, common rail fuel injection systems and others. The timing of the fuel injection, the amount of fuel injected, the number and timing of injection pulses, are preferably controlled by fuel injection system 90 and/or ECU.

ECU 28 executes software which includes a number of variables related to fuel injection. In a preferred embodiment the software utilizes some or all of the following variables:

Cylinder_Fueling: The ultimate total fuel going into the cylinder. This variable is the summed quantity of all injections.

Final Fuel: The fueling that comes out of the throttle position versus fueling table.

Injected_Aux_Fuel: The total amount of fuel going in the injection event at the Aux_SOI timing. This variable includes feedforward fueling pulled out of the main injection and part or all of Catalyst Fuel.

Injected_Aux2_Fuel: The total amount of fuel going in the injection event at the Aux2_SOI timing. This variable includes feedforward fueling pulled out of the main injection and part or all of Catalyst Fuel, and part or all of Catalyst Trim Fuel.

Injected_Aux3_Fuel: The total amount of fuel going in the injection event at the Aux3_SOI timing. This variable includes part or all of Catalyst Trim Fuel.

Catalyst Fuel: Extra amount of fuel for a regeneration event. This quantity can be split and put into the Aux and Aux2 injection events. This variable is included in Cylinder_Fueling, but not Final Fuel.

Catalyst Trim Fuel: Extra amount of fuel for a regeneration event. This variable is often closed loop feedback fuel, but can be feedforward from Regen tables. This variable can be split between Aux2 and Aux3 injection events. This variable is included in Cylinder_Fueling, but not Final Fuel.

Injected_Pilot_Fuel: Fuel provided to a pre main injection pulse. This variable is included in Cylinder_Fueling and in Final Fuel.

With reference to FIGS. 3-6, there are illustrated graphs fuel injection events for several preferred modes of operation. The X-axis of each of the illustrated graphs is piston position expressed in units of degrees after top dead center ("deg a TDC"). Thus, for example, an X-axis value of 0 (zero) indicates that piston position is at top dead center, an X-axis value of −10 indicates that piston position is 10 degrees before top dead center, and an X-axis value of 10 indicates that piston position is 10 degrees after top dead center. The Y-axis of each of the illustrated graphs is injected fueling volume in units of cubic millimeters (mm$^3$). The bars in each graph indicate injection pulses the timing of which is indicated by their X-axis position and the volume of which is indicated by of their Y-axis length. The legend in each of the illustrated graphs is a key which correlates the variables Catalyst Trim Fuel, Catalyst Fuel, and Final Fuel to the shaded portions of the injection pulses.

Figure 3:
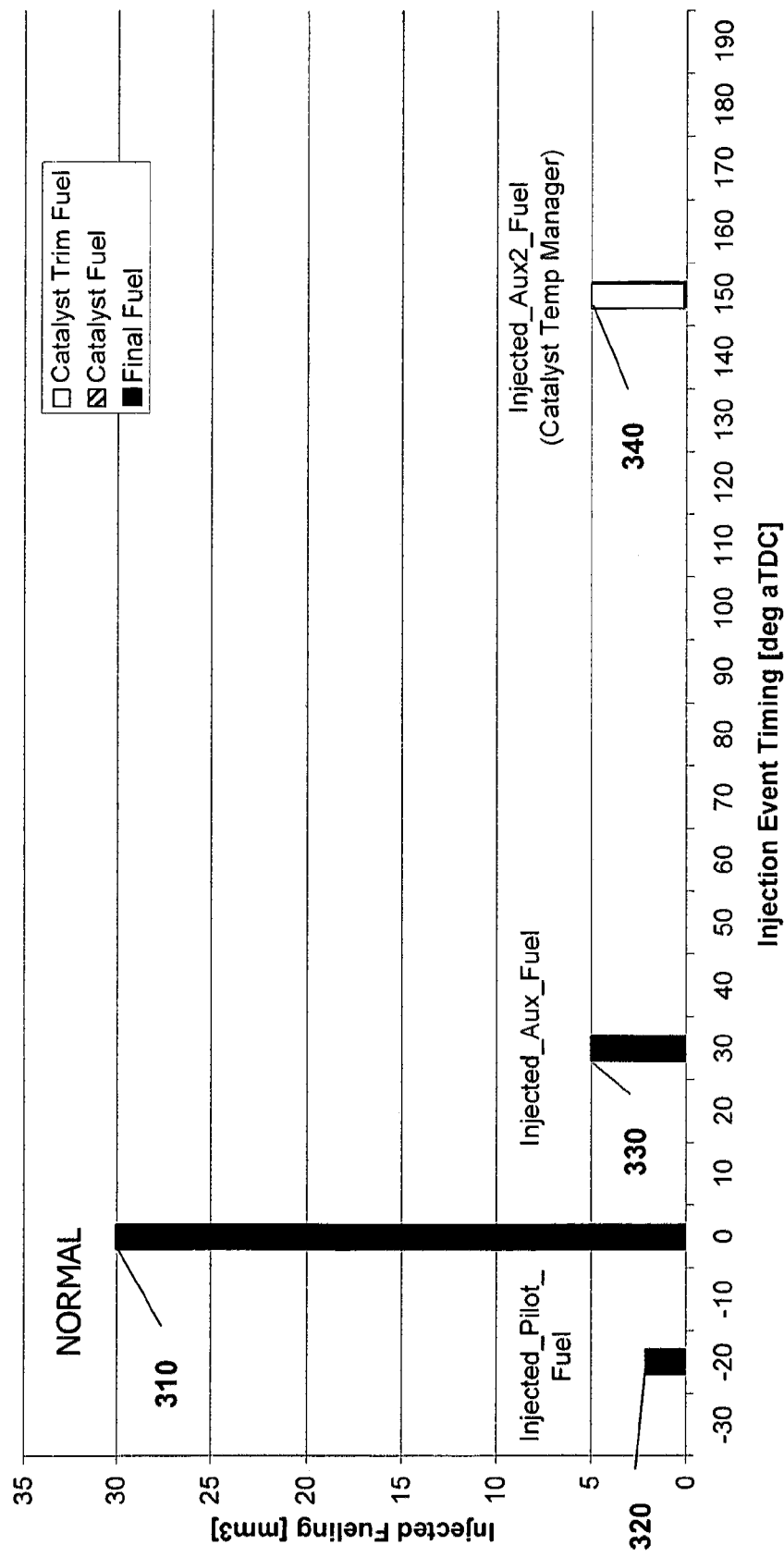
FIG. 3 is a graph of fuel injection events according to a preferred base mode.

With reference to FIG. 3, there is illustrated a graph of fuel injection events according to a preferred base mode or normal mode which is used for prime power and non-regenerative lean aftertreatment system operation. In the preferred base mode, the fuel injection events include main injection pulse 310, pilot injection pulse 320, post injection pulse 330, and second post injection pulse 340. Pilot injection pulse 320 and post injection pulse 330 are used for noise and emission control. Second post injection pulse 340 is used for catalyst temperature management. No fuel is provided by the Catalyst Fuel variable. The fuel provided by the Final Fuel variable is divided between main injection pulse 310, pilot injection pulse 320, and post injection pulse 330. The fuel provided by the Catalyst Trim Fuel variable is provided at second post injection pulse 340.

Figure 4:
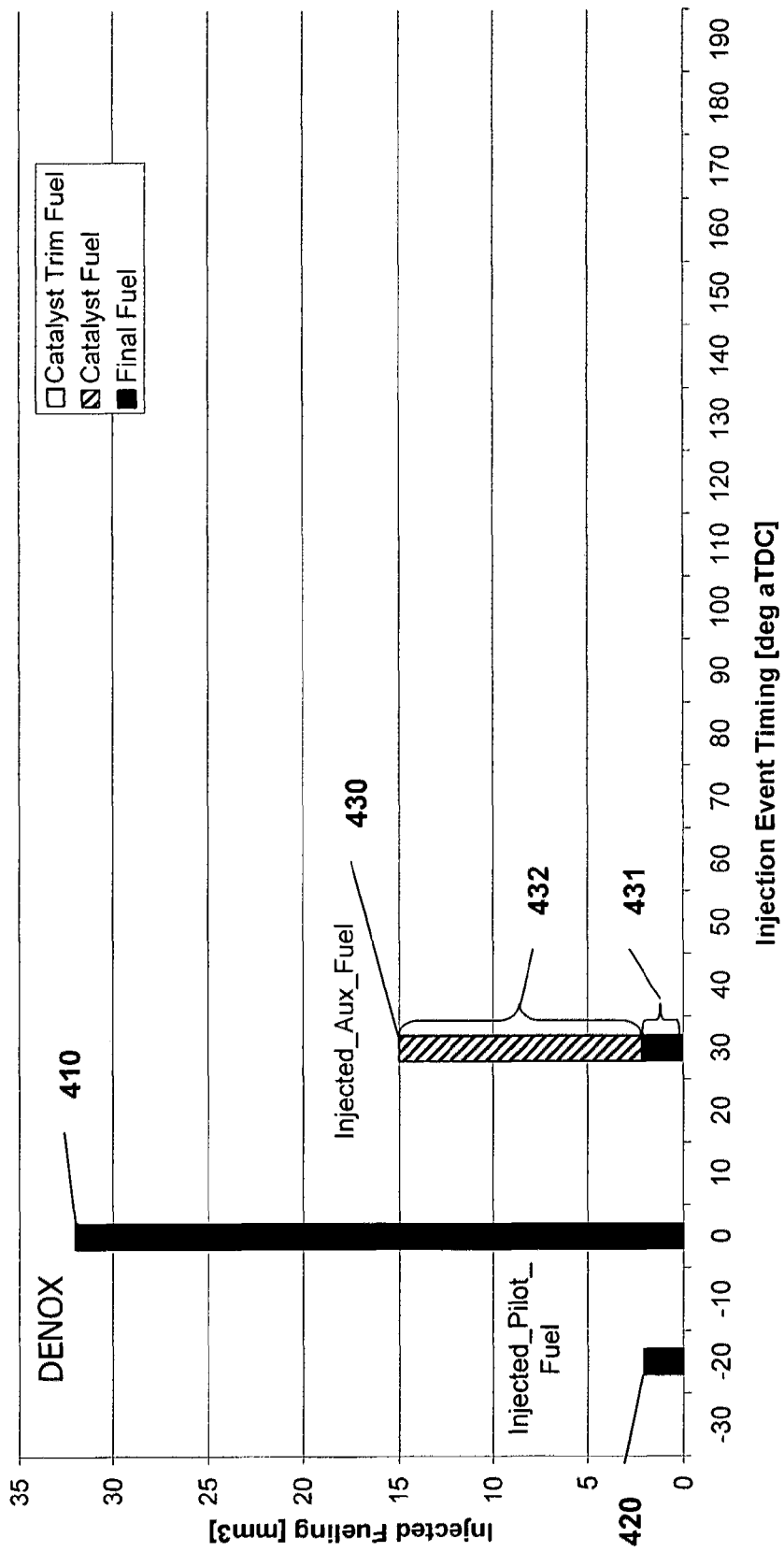
FIG. 4 is a graph of fuel injection events a graph of fuel injection events according to a preferred deNOx regeneration mode.

With reference to FIG. 4, there is illustrated a graph of fuel injection events according to a preferred deNOx regeneration mode. In the preferred deNOx regeneration mode, the fuel injection events include main injection pulse 410, pilot injection pulse 420, and post injection pulse 430. The Catalyst Fuel variable provides additional fuel at post injection pulse 430 as indicated by bracket 432. This provides rich exhaust conditions to regenerate the NOx adsorber. The fuel provided by the Final Fuel variable is divided between main injection pulse 410, pilot injection pulse 420, and the portion of post injection pulse 430 indicated by bracket 431. The quantity and timing of each of the fuel injection pulses provides transparency to the operator between the preferred base mode and the preferred deNOx regeneration mode.

Figure 5:
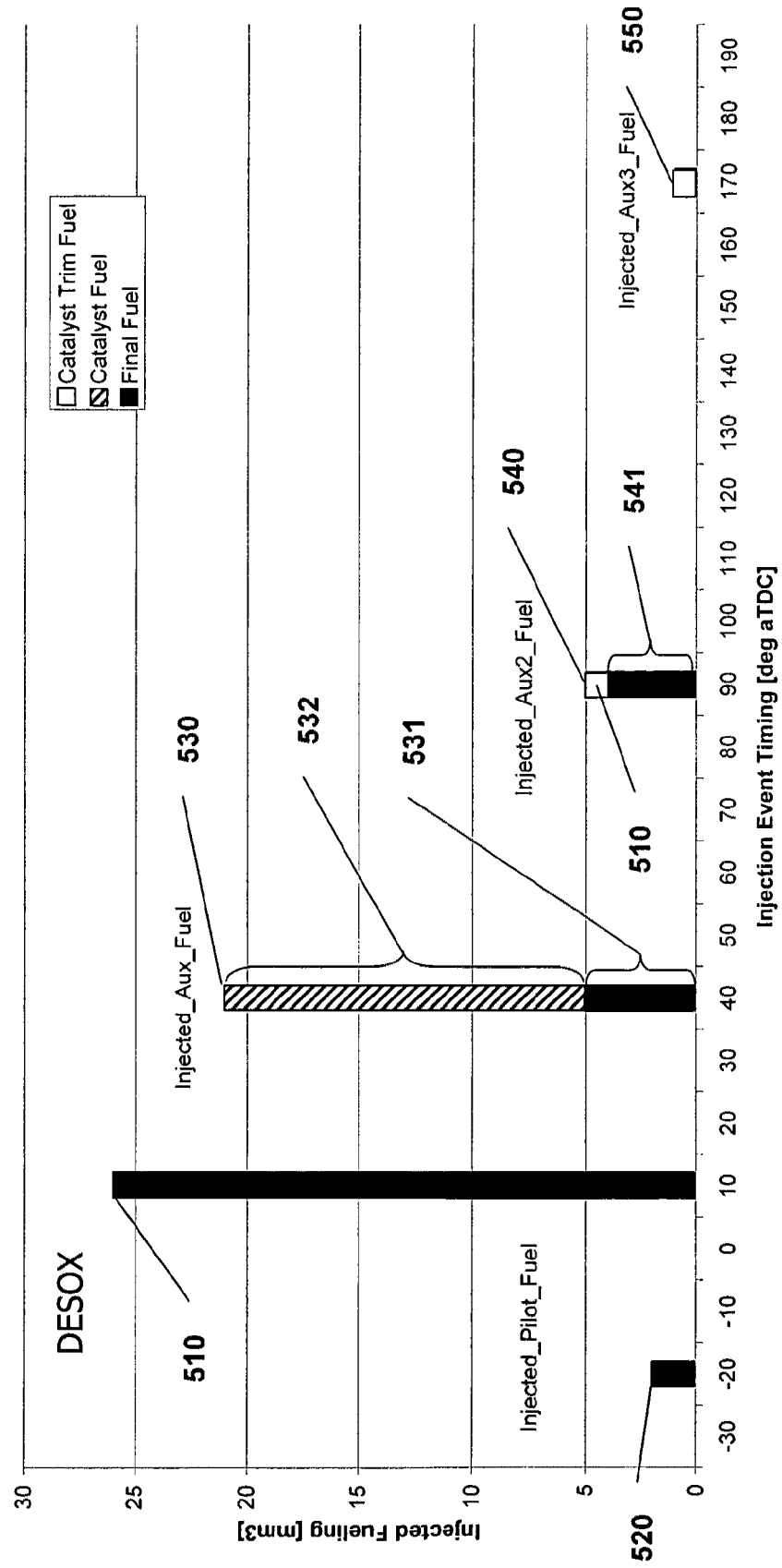
FIG. 5 is a graph of fuel injection events a graph of fuel injection events according to a preferred deSOx regeneration mode.

With reference to FIG. 5, there is illustrated a graph of fuel injection events according to a preferred deSOx regeneration mode. In the preferred deSOx regeneration mode, the fuel injection events include main injection pulse 510, pilot injection pulse 520, post injection pulse 530, second post injection pulse 540, and third post injection pulse 550. The Catalyst Fuel variable provides additional fuel at post injection pulse 530 as indicated by bracket 532. This provides rich exhaust conditions to regenerate trapped Sulfur compounds from the NOx adsorber. The fuel provided by the Catalyst Trim Fuel variable is divided between the portion of second post injection pulse 540 indicated by bracket 542, and third post injection pulse 550. The second and third post injection pulses provide temperature control during the deSOx regeneration. The fuel provided by the Final Fuel variable is divided between main injection pulse 510, pilot injection pulse 520, the portion of post injection pulse 530 indicated by bracket 531, and the portion of post injection pulse 540 indicated by bracket 541. The quantity and timing of each of the fuel injection pulses provides transparency to the operator between the preferred base mode and the preferred deSOx regeneration mode.

Figure 6:
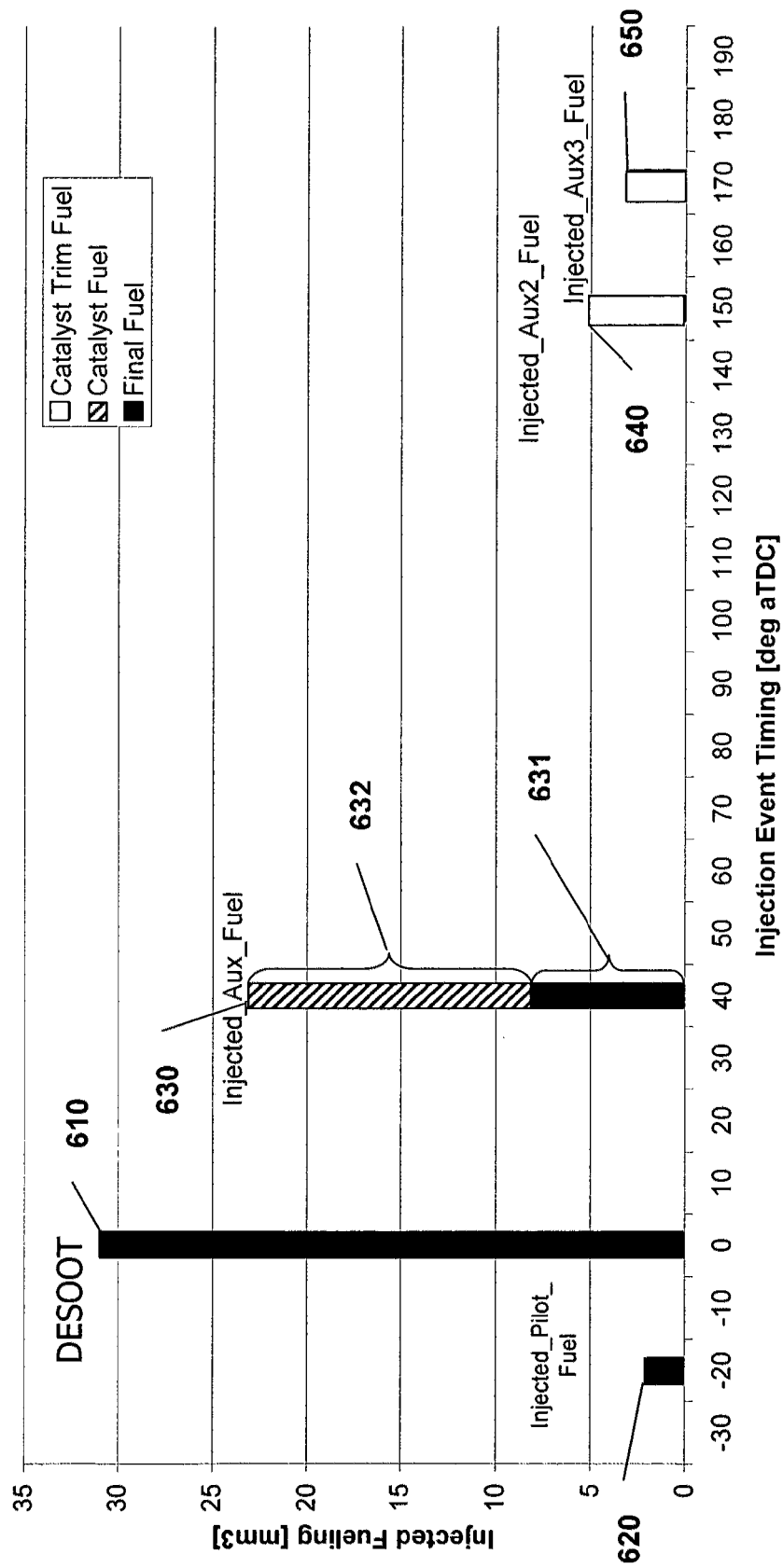
FIG. 6 is a graph of fuel injection events a graph of fuel injection events according to a preferred deSoot regeneration mode.

With reference to FIG. 6, there is illustrated a graph of fuel injection events according to a preferred deSoot regeneration mode. In the preferred deSoot regeneration mode, the fuel injection events include main injection pulse 610, pilot injection pulse 620, post injection pulse 630, second post injection pulse 640, and third post injection pulse 650. The Catalyst Fuel variable provides additional fuel at post injection pulse 630 as indicated by bracket 632. This provides extra exhaust heat to combust soot in a soot filter such as a diesel particulate filter. The fuel provided by the Catalyst Trim Fuel variable is shared by second post injection pulse 640, and third post injection pulse 650. The second and third post injection pulses provide temperature control during deSoot regeneration. The quantity and timing of each of the fuel injection pulses provides transparency to the operator between the preferred base mode and the preferred deSoot regeneration mode.

Figure 7:
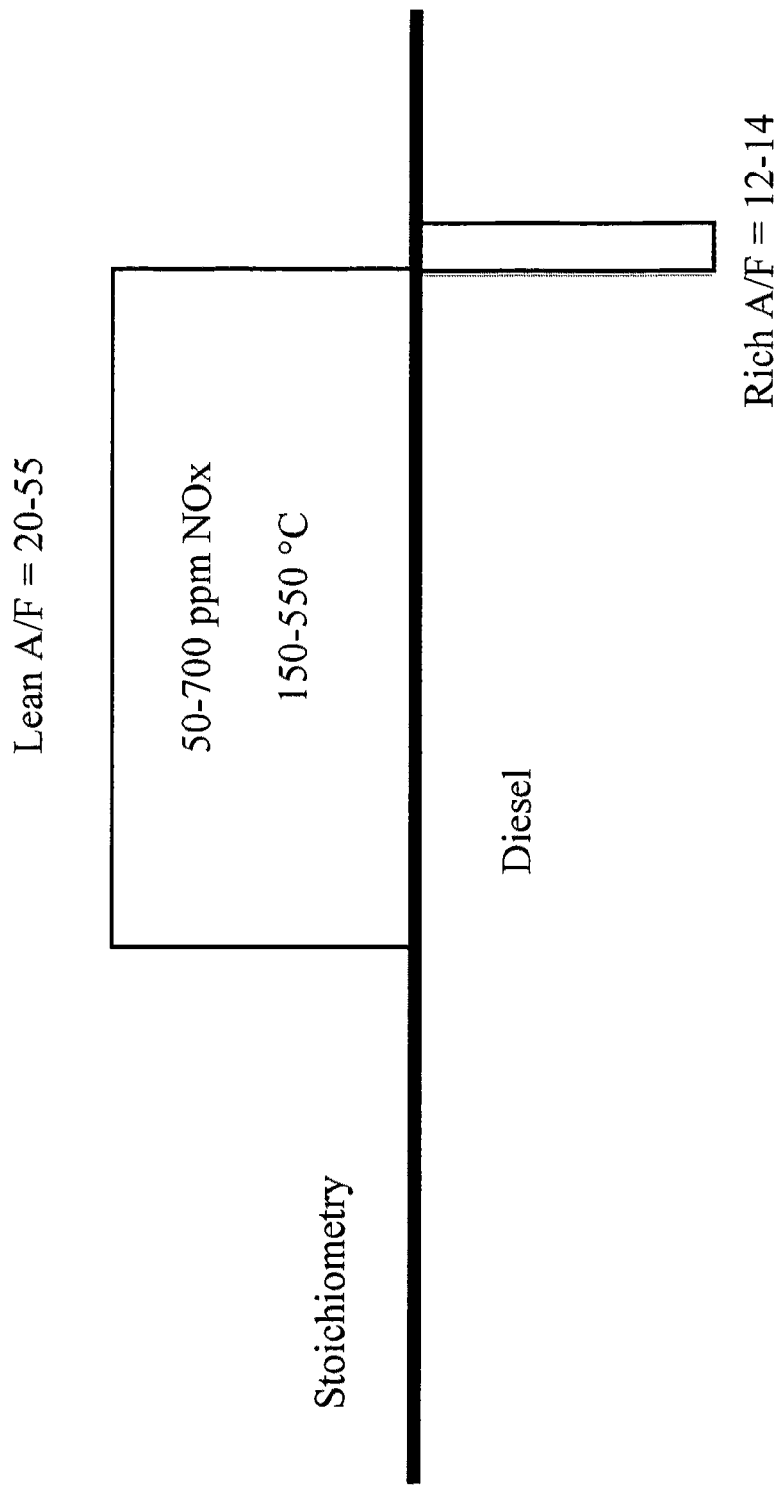
FIG. 7 is a graph showing lean and rich air/fuel ratios.

With reference to FIG. 7, there is illustrated a graph showing lean and rich exhaust air/fuel ratios. As shown in FIG. 7, the preferred lean air/fuel ratio is 20-55, the exhaust is 50-700 parts per million NOx, and temperature is 150 to 500° C. The preferred rich air/fuel ratio is 12-14.

Figure 8:
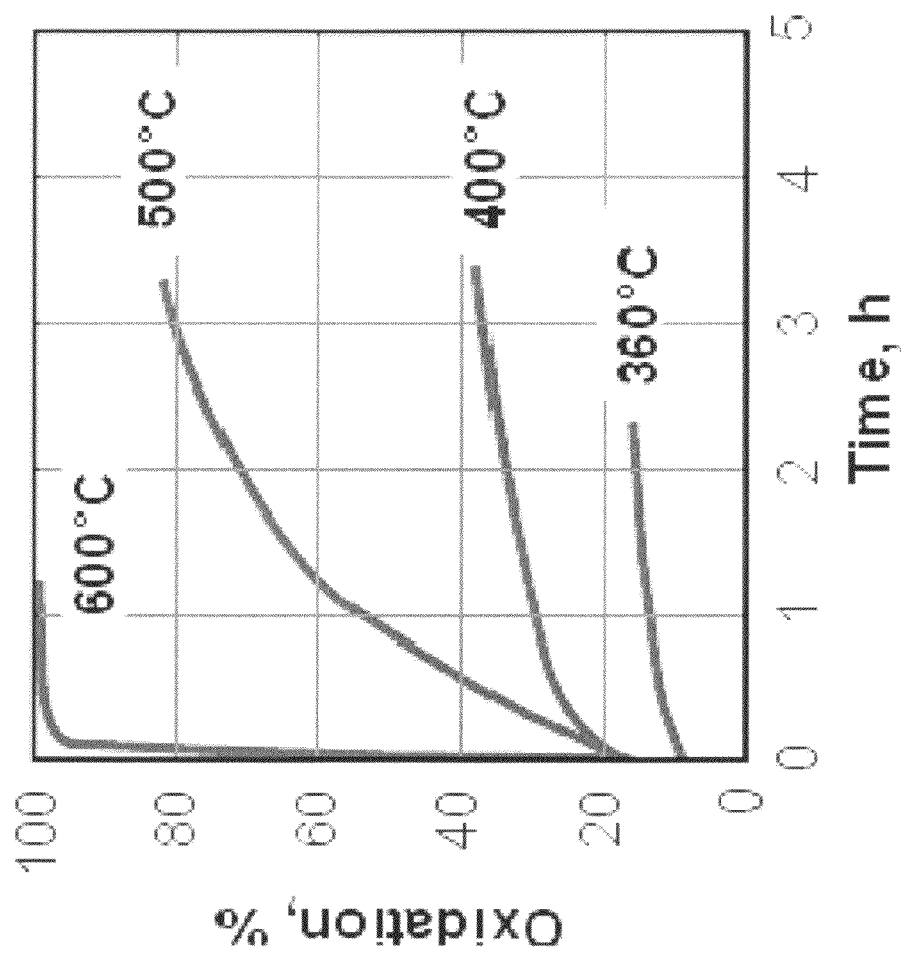
FIG. 8 is a graph showing percent oxidation versus time for deSoot regeneration at various temperatures.

With reference to FIG. 8, there is illustrated a graph showing percent oxidation in a deSoot regeneration mode as a function of time for several temperatures. The X-axis shows time in units of hours, and the Y-axis shows percent soot oxidation. Curve 810 shows the percent soot oxidation over time at 360° C. Curve 820 shows the percent soot oxidation over time at 400° C. Curve 830 shows the percent soot oxidation over time at 500° C. Curve 840 shows the percent soot oxidation over time at 600° C.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising: a controller programmed to command engine cylinder fuel injection according to a base mode, a deNOx mode, a deSOx mode, and a deSoot mode; wherein the base mode includes commands for a base mode pilot injection, a base mode main injection, and a base mode post injection, the deSoot mode includes commands for a deSoot mode main injection and one or more deSoot mode post injections, the deSOx mode includes commands for a deSOx mode main injection and one or more deSOx mode post injections, the amount of fueling commanded by the one or more deSoot mode post injections is greater than the amount of fueling commanded by the one or more deSOx mode post injections, and the commanded timing of the deSOx mode main injection is delayed relative to the commanded timing of the deSoot mode main injection.

2. The system according to claim 1 wherein the deNOx mode includes commands for a deNOx mode pilot injection, a deNOx mode main injection, and a deNOx mode post injection.

3. The system according to claim 1 wherein the deSoot mode includes commands for a deSoot mode first post injection, a deSoot mode second post injection, and a deSoot mode third post injection, and the deSOx mode includes commands for a deSOx mode first post injection, a deSOx mode second post injection, and a deSOx mode third post injection.

4. The system according to claim 3 wherein the commanded magnitude of the deSOx mode third post injection is less than the commanded magnitude of the deSoot mode third post injection.

5. The system according to claim 4 wherein the commanded magnitude of the deSOx mode first post injection is less than the commanded magnitude of the deSoot mode first post injection.

6. The system according to claim 1 further comprising a fuel injector coupled to the controller and operable to inject fuel based upon commands received from the controller.

7. A method of operating a diesel engine including an engine cylinder fueling system and an exhaust aftertreatment system comprising:
   operating the engine in a base fueling mode;
   operating the engine in a deNOx fueling mode effective to provide at least partial deNOx regeneration of the aftertreatment system;
   operating the engine in a deSOx fueling mode effective to provide at least partial deSOx regeneration of the aftertreatment system; and
   operating the engine in a deSoot fueling mode effective to provide at least partial deSoot regeneration of the aftertreatment system;
   wherein the deSoot fueling mode provides a deSoot main injection and deSoot fueling after the deSoot main injection, the deSOx fueling mode provides a deSOx main injection and deSOx fueling after the deSOx main injection, the deSOx main injection occurs later than the deSoot main injection, and the deSOx fueling after the deSOx main injection is decreased relative to the deSoot fueling after the deSoot main injection.

8. The method according to claim 7 wherein the aftertreatment system includes a NOx adsorber and the at least partial deNOx regeneration of the aftertreatment system includes releasing nitrogenous compounds stored by the NOx adsorber and the at least partial deSOx regeneration of the aftertreatment system includes releasing sulfurous compounds stored by the NOx adsorber.

9. The method according to claim 7 wherein the aftertreatment system includes a soot filter and the at least partial deSoot regeneration of the aftertreatment system includes releasing compounds stored by the soot filter.

10. The method according to claim 7 wherein the deNOx fueling mode includes increasing the amount of fuel injected after a main fuel injection.

11. The method according to claim 10 wherein the deSOx fueling mode includes increasing the amount of fuel injected after a main fuel injection center relative to the deNox mode of operation.

12. The method according to claim 11 wherein the deSOx fueling mode further includes a first post injection injecting fuel at 90 degrees after top dead center.

13. The method according to claim 12 wherein the deSoot fueling mode includes a second post injection and a third post injection after 140 degrees after top dead center.

14. A computer readable medium including non-transitory computer executable instructions for a base fueling mode, a deNOx fueling mode, a deSOx fueling mode, and a deSoot fueling mode; wherein the instructions include injection timings and quantities for a deSoot main fueling, a deSoot post fueling after the deSoot main fueling, a deSOx main fueling, and a deSOx post fueling after the deSOx main fueling; wherein the timing of the deSOx main fueling is closer to top dead center than the timing of the deSoot post fueling and the quantity of the deSoot post fueling is greater than the quantity of the deSOx post fueling.

15. The computer readable medium according to claim 14 wherein the deSoot post fueling includes a plurality of deSoot post injections.

16. The computer readable medium according to claim 15 wherein the deSOx post fueling includes a plurality of deSOx post injections.

17. The computer readable medium according to claim 16 wherein at least one of the plurality of deSoot post injections has the same timing value as and a greater quantity value than at least one of the plurality of deSOx post injections.

18. The computer readable medium according to claim 16 wherein the plurality of deSOx post injections includes a first injection at 40 degrees after top dead center, a second injection at 90 degrees after top dead center, and a third injection at 170 degrees after top dead center.

19. The computer readable medium according to claim 16, wherein the plurality of deSoot post injections includes a first injection at 40 degrees after top dead center, a second injection at 150 degrees after top dead center, and a third injection at 170 degrees after top dead center.

20. The system according to claim 5 wherein the deSOx mode third post injection and the deSoot mode third post injection have the same commanded timing.

21. The system according to claim 20 wherein the deSOx mode first post injection and the deSoot mode first post injection have the same commanded timing.

* * * * *

UNITED STATES PATENT AND TRADEMARK OFFICE
CERTIFICATE OF CORRECTION

PATENT NO. : 8,256,210 B2
APPLICATION NO. : 12/002804
DATED : September 4, 2012
INVENTOR(S) : Bradlee J. Stroia et al.

It is certified that error appears in the above-identified patent and that said Letters Patent is hereby corrected as shown below:

Col. 6, line 60 (Claim 11). Delete the word "center" after "injection"

Signed and Sealed this
Sixteenth Day of October, 2012

David J. Kappos
*Director of the United States Patent and Trademark Office*